United States Patent
Yedid Am et al.

(10) Patent No.: US 9,292,769 B1
(45) Date of Patent: Mar. 22, 2016

(54) ITERATIVE CALIBRATION OMITTING FIRST CORRECTIONS FROM A NEXT ITERATION

(71) Applicant: HEWLETT-PACKARD INDIGO B.V., Amstelveen (NL)

(72) Inventors: Tsafrir Yedid Am, Nes Ziona (IL); Dmitry Iofe, New Ziona (IL); Ran Waidman, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 14/483,388

(22) Filed: Sep. 11, 2014

(51) Int. Cl.
  *G03F 3/08* (2006.01)
  *G06K 15/02* (2006.01)
(52) U.S. Cl.
  CPC .................... *G06K 15/027* (2013.01)
(58) Field of Classification Search
  None
  See application file for complete search history.

(56) References Cited

U.S. PATENT DOCUMENTS

| | | | |
|---|---|---|---|
| 6,141,120 A | 10/2000 | Falk | |
| 7,595,911 B2 * | 9/2009 | Dolan | 358/3.08 |
| 8,259,369 B2 | 9/2012 | Klassen | |
| 8,405,879 B2 | 3/2013 | Boness et al. | |
| 9,016,824 B1 * | 4/2015 | Armbruster et al. | 347/15 |
| 9,019,551 B2 * | 4/2015 | Hayashi et al. | 358/1.18 |
| 2010/0178084 A1 * | 7/2010 | Kang et al. | 399/301 |
| 2013/0021631 A1 | 1/2013 | Nachlieli et al. | |
| 2014/0178084 A1 * | 6/2014 | Kuo et al. | 399/38 |
| 2014/0211227 A1 * | 7/2014 | Yedid Am et al. | 358/1.13 |

OTHER PUBLICATIONS

Xia et al.; End-to-End Color Printer Calibration by Total Least Squares Regression; IEEE Transactions on Image Processing, vol. 8, No. 5, May 1999; pp. 700-716.

* cited by examiner

*Primary Examiner* — Miya J Cato

(57) ABSTRACT

In an example implementation, a method of iterative calibration includes, in a first iteration, measuring first values of a calibration parameter, and determining first corrections for the measured first values. The method includes, in a next iteration, measuring next values of the calibration parameter that incorporate the first corrections. The first corrections are omitted from the next iteration measurements to provide pseudo iteration measurements, and the first iteration measurements are averaged with the pseudo iteration measurements. Second corrections are then determined based on the averaging.

20 Claims, 4 Drawing Sheets

ITERATIVE CALIBRATION OMITTING FIRST CORRECTIONS FROM A NEXT ITERATION

BACKGROUND

Calibration is a step often performed both before and during the use of many devices and systems. Calibration is the process of determining and adjusting the accuracy of a device to bring it within the manufacturer's specifications. In some examples, calibration is a comparison and matching of device parameters against values that are known to be correct for the device parameters in question. Such known values can be referred to as the standard values. In some calibration examples, the device being calibrated can be compared to a device whose parameters are known to comply with the standard values for the parameters of the particular device. Devices and systems that are not properly calibrated can produce results that are erroneous, of poor quality, or are substandard in some way relative to the purpose of the device or system.

BRIEF DESCRIPTION OF THE DRAWINGS

The present embodiments will now be described, by way of example, with reference to the accompanying drawings, in which.

Throughout the drawings, identical reference numbers designate similar, but not necessarily identical, elements.

DETAILED DESCRIPTION

Figure 1:
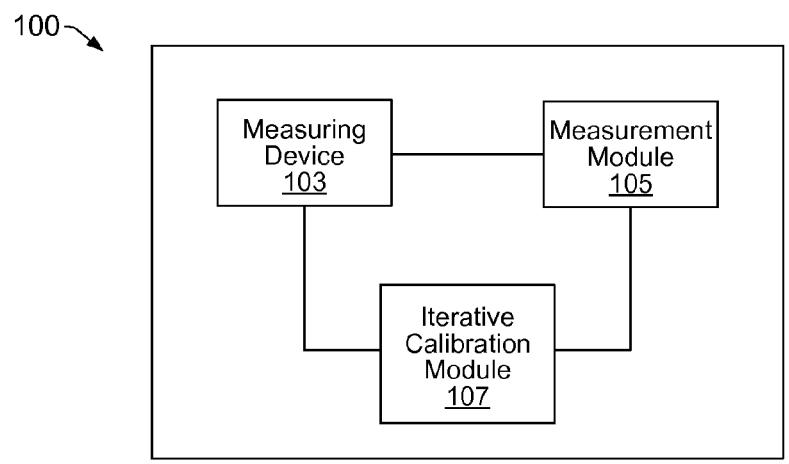
FIG. 1 shows an example of a system that enables iterative calibration using accumulated data from all iterations.

As noted above, calibrating a device helps to adjust the device performance to bring it within the manufacturer's specifications. Properly calibrated devices can produce results that are more accurate and/or of higher quality than devices that have not been properly calibrated. Printing devices are examples of devices that can be calibrated to help improve the quality of printed output. In some printing devices, calibration can involve matching colors on a monitor with colors on printed output, optimizing ink distribution on the print media, providing a uniform progression of ink tints without tonal distortions, and so on. In addition, because different print media can absorb ink differently, a separate calibration can be used for each media type.

One example of a printing device that can be calibrated is a digital printing press. Calibrations in digital printing presses often involve iterative processes that can include color calibration, color plane registration calibration, front-to-back calibration, and so on. In an example of an iterative calibration process, the state of the printing press can be measured during a first iteration, and parameters can be changed according to the measurements in order to make corrections. The press state can then be measured again in a subsequent iteration to determine if the corrections have brought the press within the manufacturer's calibration specifications. This iterative process can continue until the parameters converge to bring the press state into proper calibration.

Such iterative calibration processes assume that the press state is kept constant between iterations, so that measurements from one iteration are valid for use in subsequent iterations. However, in some circumstances the press can be noisy and the press state can change from one iteration to another. Thus, the correction of one iteration can overshoot the target calibration, resulting in non-convergence of the calibration parameters and a calibration failure. In some other circumstances, however, even when the press is noisy and unstable, the calibration parameters can converge "accidentally" to indicate a successful calibration. Unfortunately, such false successful calibrations can occur by mere chance when a current iteration is executed in the same or similar press state as the previous iteration. Therefore, the calibration result can be erroneous, and using the calibration parameters later on may result in printed output that is unacceptable. In order to minimize such chance occurrences, the standard deviation ($\sigma$) of the calibration can be limited for successful calibration. However, this yields more failures for noisy substrates.

One solution for this problem is to use several prints (i.e., to print several pages) for each iteration. This solution assumes that different types of substrates (i.e., media sheets) will experience different press states, and that an average of the measurements can then be taken over an ensemble of press states. However, it turns out that when pages are reproduced during printing, the press state can change even more dramatically than it changes between sequentially printed sheets.

Accordingly, example methods and systems described herein enable an iterative calibration process that uses accumulated data from previous iterations to achieve an accelerated calibration convergence. The described method involves accumulating data from all previous calibration iterations while treating the data as if all iterations were performed at the same system state (e.g., all iterations printed at the same press state). In general, data measured from all iterations is averaged together to make corrections for a next iteration. However, prior to averaging the data, corrections previously applied are removed from data measured in the current iteration. Because the method collects data from a broad group of system states, the calibration is more robust. The method improves calibration results, accelerates calibration convergence, and allows convergence in circumstances where a system is noisy (e.g., a noisy press), and where prior calibration methods fail to converge.

In one example, a method of iterative calibration includes, in a first iteration, measuring first values of a calibration parameter, and determining first corrections for the measured first values. The method includes, in a next iteration, measuring next values of the calibration parameter that incorporate the first corrections. The first corrections are omitted from the next iteration measurements to provide pseudo iteration measurements, and the first iteration measurements are averaged with the pseudo iteration measurements. Second corrections are then determined based on the averaging.

In another example, a printing device includes a print engine to iteratively print a pattern of dots in a color plane, and a measurement module to determine a misregistration for each printed dot. The printing device includes an iterative calibration module to determine a first correction based on misregistrations from a first iteration, apply the first correction to the print engine for a second iteration, remove the first correction from a result of the second iteration, average the first and second iterations to determine a second correction, and apply the second correction to the print engine for a third iteration.

In another example, a non-transitory machine-readable storage medium stores instructions that when executed by a processor of a printing device, cause the printing device to take a first color plane registration (CPR) measurement at a plurality of grid locations on a media page, and determine a first correction constant for each grid location. The printing device makes adjustments based on the first correction constants, and then takes a second CPR measurement at the plurality of grid locations. The printing device removes the first correction constants from the second CPR measurement to determine a pseudo second CPR measurement, and calculates an average of the first CPR measurement and the pseudo second CPR measurement. The printing device then determines a second correction constant for each grid location based on the average.

FIG. 1 conceptually illustrates an example of a system 100 that enables calibration convergence using accumulative iterations as described herein. The system 100 can represent any system or device that incorporates a calibration process to determine and adjust parameters in order to bring the system or device into a calibrated state. As discussed herein below, in one example a system 100 comprises a printing press.

System 100 includes a measurement device 103 to measure the state of the system over a number of iterations. Measuring the state of the system 100 can include measuring one or multiple calibration parameters. The system 100 also includes a measurement module 105 and an iterative calibration module 107. In different examples, the modules 105 and 107 can comprise hardware, programming instructions, or a combination of hardware and programming instructions designed to perform a particular function or combination of functions. Hardware incorporated into modules 105 and 107 can include, for example, a processor and a memory, while the programming instructions comprise code stored on the memory and executable by the processor to perform the designated function.

A function of the measurement module 105 is to determine an offset between an expected value of the calibration parameter and the actual/measured value of the calibration parameter. The iterative calibration module 107 is to determine a correction based on the offset from each iteration. Thus, the iterative calibration module 107 determines a first correction based on an offset determined in a first iteration, and the correction is applied to the system 100. The state of the system (i.e., calibration parameter) is then measured in a second iteration to determine if the parameter has converged to bring the system into calibration. When the measurement module 105 determines that an offset remains between the expected value of the calibration parameter and the actual/measured value of the calibration parameter, the iterative calibration module 107 prepares for a next iteration by averaging the data/measurements from prior iterations. Before averaging the measurements however, the module 107 removes from the second iteration measurements, the first correction that was previously applied from the first iteration. The module 107 then averages the measurements from the first iteration and the second iteration (with corrections removed), and determines a next correction based on the averaged measurements. The next correction is then applied, and another measurement iteration is performed. Removing the corrections prior to averaging the two iterations makes it so the measurements for the two iterations are based on the same parameters, instead of different parameters. Thus, averaging measurements from the two iterations after removing prior corrections enables an appropriate accumulation of data that treats the all the data as if it were measured at the same system state.

Figure 2:
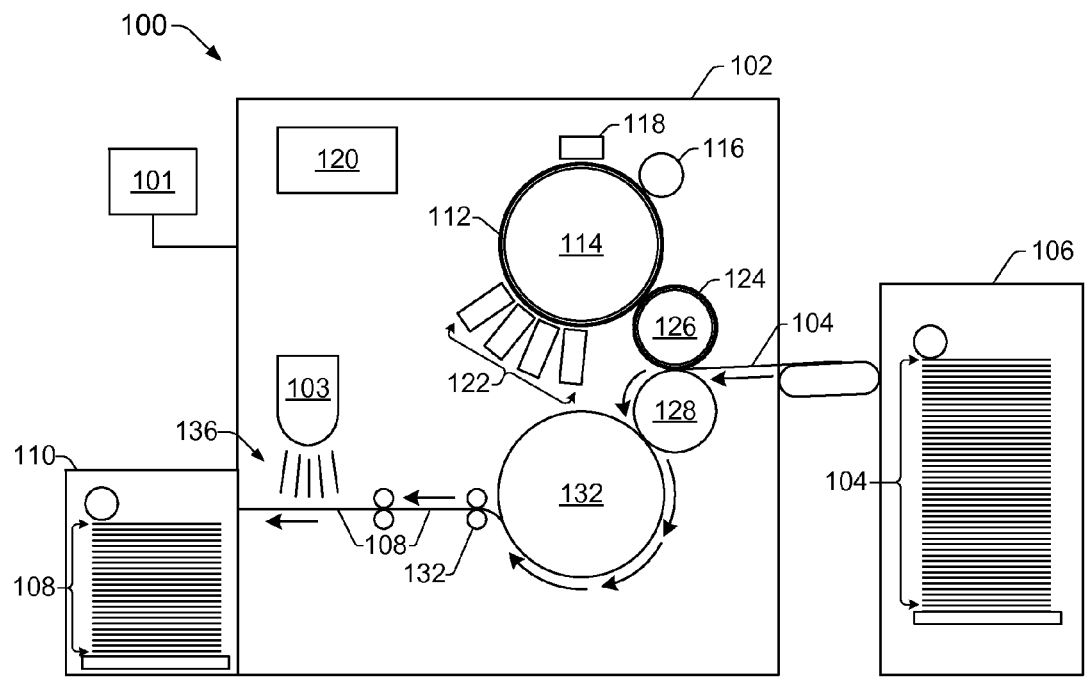
FIG. 2 shows a box diagram of a controller suitable for controlling a print engine to generate printed substrate and implementing a color plane registration algorithm.

FIG. 2 shows an example system 100 implemented as a printing device 100 that enables calibration convergence using accumulative iterations as described herein. The printing device 100 comprises a print-on-demand device, such as a liquid electro-photography (LEP) printing press. A printing device 100 implemented as an LEP printing press 100 generally includes a user interface 101 that enables an operator to manage various aspects of printing, such as loading and reviewing print jobs, proofing and color matching print jobs, running a calibration process, handling media substrates, and so on. The user interface 101 typically includes a touch-sensitive display screen that allows the operator to interact with information on the screen, make entries on the screen, and generally control the press 100. A user interface 101 may also include other devices such as a key pad, a keyboard, a mouse, and a joystick, for example.

An LEP printing press 100 includes a print engine 102 that receives print media/substrate 104 from one or more media input mechanisms 106, and outputs printed media/substrate 108 to one or more media output mechanisms, such as output stacker tray 110. Print media 104 can be in various forms including cut-sheet paper 104 from a stacked media input mechanism 106 as shown in FIG. 1, or a media web from a media paper roll input mechanism (not shown). In general, the print engine 102 generates printed media/substrate 108 in the form of printed jobs and outputs the printed substrate 108 to an output stacker tray 110. When the printed substrate 108 is a media web, one or more finishing devices may be employed to cut the printed media web into sheets prior to it being stacked in an output stacker tray 110. Alternatively, the printed media web may not be cut into sheets and stacked, but instead may be output to a media output roll (not shown).

As shown in FIG. 1, an example LEP printing press 100 also includes a measurement device 103, such as an in line scanner, to measure ink patterns printed onto a printed substrate 108. A light source (not shown) may accompany the measurement device 103 to provide illumination for reflecting off the printed substrate 108. In some examples, as described herein below, the measurement device 103 can be used to calibrate the color plane registration of the printing press 100.

The print engine 102 includes a photo imaging component, or photoreceptor 112, sometimes referred to as a photo imaging plate (PIP). The photoreceptor 112 is mounted on a drum or imaging cylinder 114, and it defines the outer surface of the imaging cylinder 114 on which images can be formed. In some examples, images comprise calibration patterns used in a calibration process. A charging component such as charge roller 116 generates electrical charge that flows toward the photoreceptor surface and covers it with a uniform electrostatic charge. A laser imaging unit 118 exposes image areas on the photoreceptor 112 by dissipating (neutralizing) the charge in those areas. Exposure of the photoreceptor 112 creates a 'latent image' in the form of an invisible electrostatic charge pattern that replicates the image to be printed.

After the latent/electrostatic image is formed on the photoreceptor 112, the image is developed by a binary ink development (BID) roller 122 to form an ink image on the outer surface of the photoreceptor 112. Each BID roller 122 develops a single ink color (i.e., a single color separation) of the image, and each developed color separation corresponds with one image impression. While four BID rollers 122 are shown, indicating a four color process (i.e., C, M, Y, and K), other press implementations may include additional BID rollers 122 corresponding to additional colors. After a single color separation impression of an image is developed onto the photoreceptor 112, it is electrically transferred from the photoreceptor 112 to an image transfer blanket 124, which is electrically charged through an intermediate drum or transfer cylinder 126. The image transfer blanket 124 overlies, and is securely attached to, the outer surface of the transfer cylinder 126. The transfer cylinder 126 is configured to heat the blanket 124, which causes the liquid in the ink to evaporate and the solid particles to partially melt and blend together, forming a hot adhesive liquid plastic that can be transferred to a print substrate 104.

In the case of a printing device 100 that uses a print substrate 104 comprising cut-sheet paper from a stacked media input mechanism 106, as shown in FIG. 1, a single color separation impression of an image is transferred from the image transfer blanket 124 to a sheet of the print substrate 104 held by an impression cylinder 128. The above process of developing image impressions and transferring them to the sheet of print substrate 104 is then repeated for each color separation of the image. The sheet of print substrate 104 remains on the impression cylinder 128 until all the color separation impressions (e.g., C, M, Y, and K) in the image have been transferred to the sheet. After all the color impressions have been transferred to the sheet of print substrate 104, the printed substrate 108 sheet comprises the full image. The printed substrate 108 sheet with the full image is then transported by various rollers 132 from the impression cylinder 128 to the output mechanism 110.

In the case of a printing device 100 that uses a print substrate 104 comprising a media web from a media paper roll input mechanism 106, the different color separations (e.g., C, M, Y, and K) of an image are transferred together from the image transfer blanket 124 to the web of print substrate 104. Thus, the full image is built up on the blanket 124 prior to being transferred to the print substrate 104. Here, the imaging process involves transferring each color separation from the photoreceptor 112 to the image transfer blanket 124 until all the color separations making up the full image are present on the transfer blanket 124. Once all the color separations forming the full image have been transferred onto the image transfer blanket 124, the inks for all the color separations are heated on the blanket 124, and the full image is transferred from the blanket 124 to the web of print substrate 104. The printed substrate 108 web with the full image is then transported by various rollers 132 to the output mechanism 110 where it is typically cut and stacked, or rolled onto an output media roll.

In a digital LEP printing device 100, images are created from digital image data that represents words, pages, text and images that can be created, for example, with electronic layout and/or desktop publishing programs, cameras, scanners, and so on. A controller 120 uses the digital image data to control components of the print engine 102 during the printing process to generate printed media/substrate 108, such as controlling the laser imaging unit 118 to selectively expose the photoreceptor 112. Digital image data is generally formatted as one or more print jobs stored and executed on controller 120, as further discussed below. In addition to controlling the printing process, controller 120 controls the operation of the measuring device 103 and implements an iterative calibration process to calibrate the color plane registration (CPR) of the printing device 100 using measurement data accumulated from all iterations.

Figure 3:
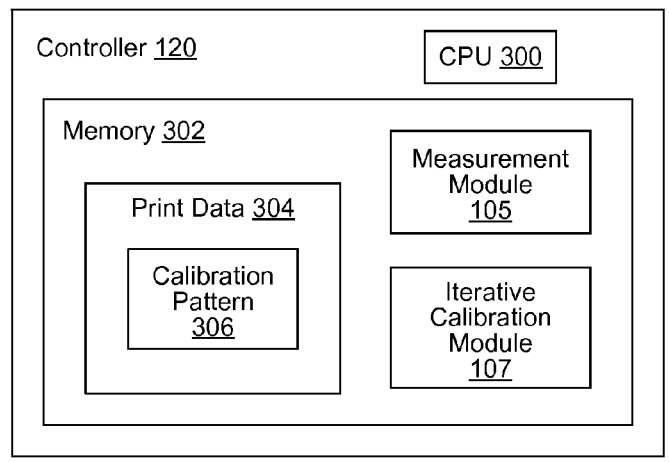
FIG. 3 shows a box diagram of an example controller suitable for controlling a print engine to generate printed media/substrate, and for implementing an iterative calibration process.

FIG. 3 shows a box diagram of a controller 120 suitable for controlling a print engine 102 to generate printed media/substrate 108, and for implementing an iterative calibration process to calibrate the color plane registration (CPR) of the printing device 100 using measurement data accumulated from all calibration iterations. Controller 120 generally comprises a processor (CPU) 300 and a memory 302, and may additionally include firmware and other electronics for communicating with and controlling the components of print engine 102, such as the user interface 101 and the media input (106) and output (110) mechanisms. Memory 302 can include both volatile (i.e., RAM) and nonvolatile (e.g., ROM, hard disk, floppy disk, CD-ROM, etc.) memory components comprising non-transitory, machine-readable (e.g., computer-processor-readable) media that provide for the storage of machine-readable coded instructions, data structures, program modules, JDF (job definition format), and other data, generally executable by a processor 300.

As noted above, controller 120 uses digital image data to control the laser imaging unit 118 in the print engine 102 to selectively expose the photoreceptor 112. More specifically, controller 120 receives print data 304 from a host system, such as a computer, and stores the data 304 in memory 302. Data 304 represents, for example, documents or image files to be printed. As such, data 304 forms one or more print jobs for printing device 100 that each include print job commands and/or command parameters. Using a print job from data 304, controller 120 controls components of print engine 102 (e.g., laser imaging unit 118) to form characters, symbols, and/or other graphics or images on print media/substrate 104.

In addition to controlling print engine 102 for printing, controller 120 also implements an iterative calibration process with respect to various aspects of the press 100 including color calibration, color plane registration calibration, front-to-back calibration, and so on. An example of an iterative calibration process is described herein below with regard to color plane registration. In general, color plane registration (CPR) presents an ongoing challenge within digital printing presses such as printing press 100. In a multi-color printing process such as performed by press 100, the image formation process is performed separately for each of the colors to produce the finished image. Each image comprises a single color separation referred to as a "color plane," and the color planes are brought together to form the finished image. A finished image may not be formed of all the available colors, but instead may be formed of any one or combination of the available colors. Where multiple colors are used, however, the quality of the finished image depends on how well the color planes are aligned with one another. The alignment of color planes is referred to as "color plane registration" (CPR), and images having misregistered (i.e., misaligned) color planes can appear to lack sharpness and/or be unclear, or have other anomalies such as a noticeable color shift in the printed color. One of the causes for CPR error is the changes that the sheet experiences between separations. While the sheet may shrink locally, it may broaden out at some other location when the sheet is ironed by the press drums. Depending on the state of the press 100, sequential sheets can be ironed differently. In addition to changing between sequential sheets, the press state can change even more between print iterations (e.g., between jobs).

Thus, in one example of an iterative calibration process, the controller 120 calibrates the CPR of the printing press 100. To this end, the controller 120 includes a measurement module 105 and an iterative calibration module 107 stored in memory 302. The measurement module 105 and iterative calibration module 107 comprise instructions executable on processor 300 to implement the iterative calibration process that uses a calibration pattern 306 and measurement data accumulated over all calibration iterations to calibrate the CPR of printing press 100. The iterative calibration process can be initiated during printing, at a scheduled interval, and/or upon receiving a user instruction via the user interface 101.

Figure 4:
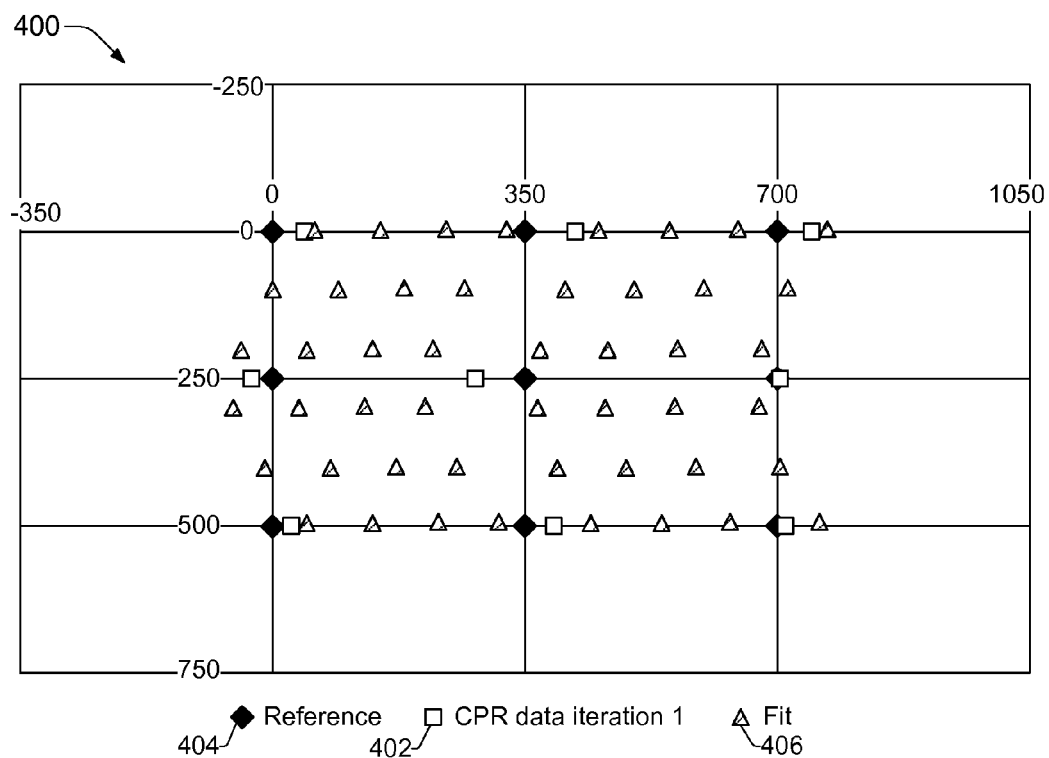
FIG. 4 shows an example pattern printed on a media sheet that includes examples of measured color plane registration location data.

The iterative calibration module 107 calibrates the CPR by collecting measured misregistration data over more than one calibration iteration, and averaging over the measured data collected from all iterations. In an iteration, a calibration pattern 306 print job can be printed, and the measuring device 103 (e.g., in line scanner) can measure the printed sheet to provide the registration of each printed point within the printed pattern. Thus, each printed point on the sheet has an (x,y) coordinate location that is measured by measuring device 103. FIG. 4 shows an example pattern 306 printed on a media sheet 400 that includes example measured CPR location data 402 from a first iteration, along with example reference data 404, and data fit 406 to a two-dimensional (2D) polynomial. Because iterations are printed using different parameters, to average over all iterations the misregistration of all printed sheets should be calculated as if all sheets were printed with the same parameters. Therefore, measurements are fitted by a 2D polynomial corresponding with the (x,y) location on the sheet 400. Each iteration is printed with a different polynomial according to previous iterations. In order to accumulate data of all iterations together, the next polynomial fit is calculated by evaluating the misregistration of each (x,y) location from the misregistration measurements and the polynomial that was used in each iteration. For example, consider that the first measurement ($m_1$) of the misregistration per (x,y) location is given in the following Table #1:

TABLE #1

| A. X location [mm] | B. Y location [mm] | C. HCPR [um] |
|---|---|---|
| 0 | 0 | 25 |
| 350 | 0 | 50 |
| 700 | 0 | 37 |
| 0 | 250 | −10 |
| 350 | 250 | −70 |
| 700 | 250 | 2 |
| 0 | 500 | 10 |
| 350 | 500 | 12 |
| 700 | 500 | 5 |

The plane misregistration can be fitted by a 2D polynomial of the form $$\text{misregistration} = \sum_{i=0, j=0}^{i+j=2} C_{ij} \cdot X^i \cdot Y^j$$

Plugging in column C as the misregistration, column A as X, and column B as Y, the 2D polynomial fit yields corrections (C) as shown in Table #2:

TABLE #2

| $C_{20}$ | 0.00012 |
|---|---|
| $C_{11}$ | −0.000049 |
| $C_{10}$ | −0.06 |
| $C_{02}$ | 0.00079 |
| $C_{01}$ | −0.43 |
| $C_{00}$ | 34.64 |

This polynomial is $p_1$, and it corresponds to measurement $m_1$. The given measurements and the polynomial fit, per (x,y) location are shown in FIG. 4.

Consider now that the second iteration yields measurements ($m_2$), per (x,y) location as shown in the following Table #3:

TABLE #3

| X location [mm] | Y location [mm] | HCPR [um] |
|---|---|---|
| 0 | 0 | 20 |
| 350 | 0 | 10 |
| 700 | 0 | −5 |
| 0 | 250 | 32 |
| 350 | 250 | 30 |
| 700 | 250 | 15 |
| 0 | 500 | 41 |
| 350 | 500 | 35 |
| 700 | 500 | 20 |

In order to average over the two iterations and evaluate the polynomial for the third iteration, the measurements cannot just be added to one another, because the two iterations were not printed with the same parameters. The first iteration was printed without any polynomial (i.e., no corrections), while the second iteration was printed with a polynomial resulting from the first iteration. Therefore, the polynomial from the second iteration measurements is first removed before averaging over the two iterations, in order to provide the next iteration polynomial, as shown in the following Table #4:

TABLE #4

| A. $1^{st}$ measurement ($m_1$) | B. evaluation of $1^{st}$ polynomial per location ($p_1(x,y)$) | C. $2^{nd}$ measurement ($m_2$) | D. pseudo $2^{nd}$ measurement (C-B) | E. average of 2 iterations (A,D) |
|---|---|---|---|---|
| 25 | 34.64 | 20 | −14.64 | 5.18 |
| 50 | 27.89 | 10 | −17.89 | 16.06 |
| 37 | 49.47 | −5 | −54.47 | −8.74 |
| −10 | −24.44 | 32 | 56.44 | 23.22 |
| −70 | −35.44 | 30 | 65.44 | −2.28 |
| 2 | −18.11 | 15 | 33.11 | 17.56 |
| 10 | 14.81 | 41 | 26.19 | 18.10 |
| 12 | −0.44 | 35 | 35.44 | 23.72 |
| 5 | 12.64 | 20 | 7.36 | 6.18 |

The new the 2D polynomial fit ($p_2$) yields corrections (C) as shown in the following Table #5:

TABLE #5

| $C_{20}$ | −0.000018 |
|---|---|
| $C_{11}$ | 0.0000057 |
| $C_{10}$ | −0.0036 |
| $C_{02}$ | −0.000044 |
| $C_{01}$ | 0.044 |
| $C_{00}$ | 9.17 |

Generalizing the above calculation yields:

$$p_n = \text{fit}\left(\frac{\sum_{i=1}^{n} m_i - p_{i-1}}{n}\right),$$

where $p_0=0$.

Figure 5:
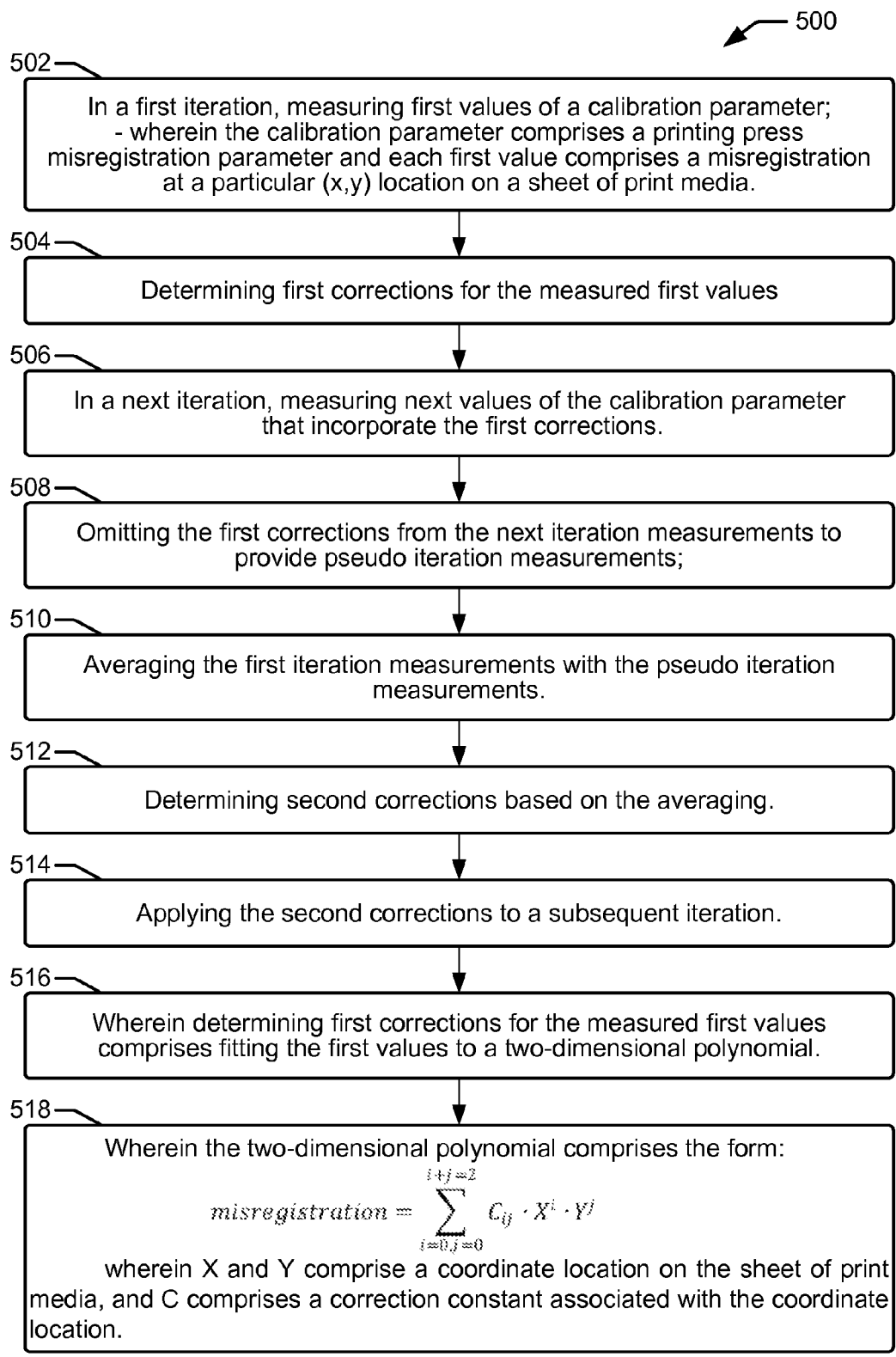
FIGS. 5 and 6 show flow diagrams that illustrate example methods related to an iterative calibration process that uses accumulated data from previous iterations to achieve an accelerated calibration convergence.
Figure 6:
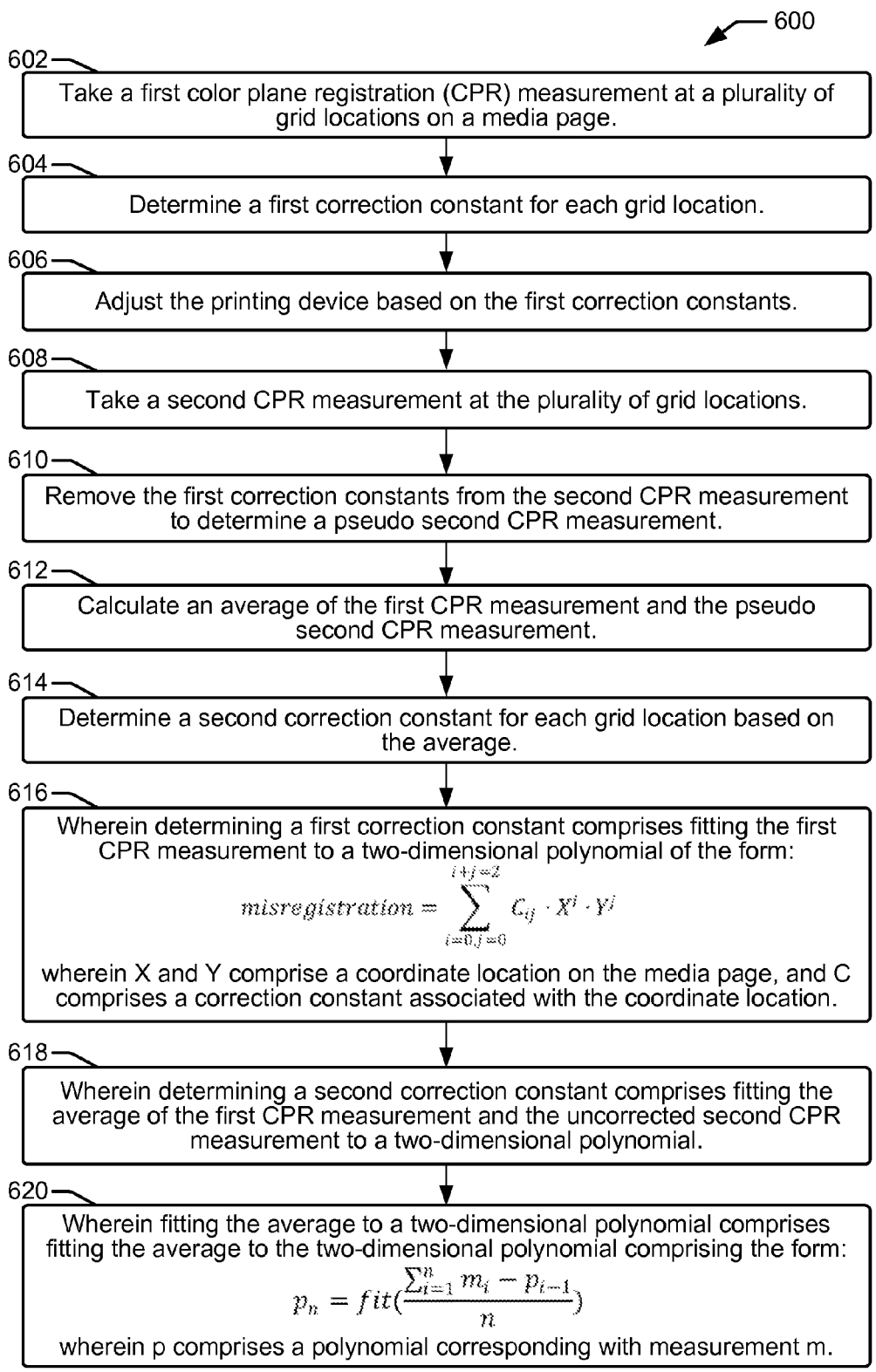

FIGS. 5 and 6 show flow diagrams that illustrate example methods 500 and 600, related to an iterative calibration process that uses accumulated data from previous iterations to achieve an accelerated calibration convergence. Methods 500 and 600 are associated with the examples discussed above with regard to FIGS. 1-4, and details of the operations shown in methods 500 and 600 can be found in the related discussion of such examples. The operations of methods 500 and 600 may be embodied as programming instructions stored on a non-transitory, machine-readable (e.g., computer/processor-readable) medium, such as memory 302 as shown in FIG. 3. In some examples, implementing the operations of methods 500 and 600 can be achieved by a processor, such as a processor 300 of FIG. 3, reading and executing the programming instructions stored in a memory 302. In some examples, implementing the operations of methods 500 and 600 can be achieved using an ASIC (application specific integrated circuit) and/or other hardware components alone or in combination with programming instructions executable by processor 300.

Methods 500 and 600 may include more than one implementation, and different implementations of methods 500 and 600 may not employ every operation presented in the respective flow diagrams. Therefore, while the operations of methods 500 and 600 are presented in a particular order within the flow diagrams, the order of their presentation is not intended to be a limitation as to the order in which the operations may actually be implemented, or as to whether all of the operations may be implemented. For example, one implementation of method 500 might be achieved through the performance of a number of initial operations, without performing one or more subsequent operations, while another implementation of method 500 might be achieved through the performance of all of the operations.

Referring now to the flow diagram of FIG. 5, an example method 500 of iterative calibration begins at block 502, with a first calibration iteration in which first values of a calibration parameter are measured. In some examples, the calibration parameter comprises a printing press misregistration parameter and each first value comprises a misregistration at a particular (x,y) location on a sheet of print media. As shown at block 504, first corrections are determined for the measured first values. In a next iteration, as shown at block 506, next values of the calibration parameter that incorporate the first corrections are measured. The method continues at block 508 with omitting the first corrections from the next iteration measurements in order to provide pseudo iteration measurements. That is, the pseudo iteration measurements are the next iteration measurements with the corrections from the first iteration removed (i.e., subtracted out). At block 510, the first iteration measurements are averaged with the pseudo iteration measurements, and second corrections are determined based on the averaging as shown at block 512. The second corrections are then applied to a subsequent iteration, as shown at block 514.

As shown at block 516, determining the first corrections for the measured first values (block 504) comprises fitting the first values to a two-dimensional polynomial. As shown at block 518, in some examples the two-dimensional polynomial can comprise a polynomial of the form:

$$\text{misregistration} = \sum_{i=0, j=0}^{i+j=2} C_{ij} \cdot X^i \cdot Y^j$$

wherein X and Y comprise a coordinate location on the sheet of print media, and C comprises a correction constant associated with the coordinate location.

Referring now to the flow diagram of FIG. 6, an example method 600 related to an iterative calibration process in a printing device is shown. The method 600 begins at block 602 with taking a first color plane registration (CPR) measurement at a plurality of grid locations on a media page. A first correction constant for each grid location is then determined as shown at block 604. At block 606, the printing device is adjusted based on the first correction constants, and a second CPR measurement is taken at the plurality of grid locations, as shown at block 608. The first correction constants are removed from the second CPR measurement to determine a pseudo second CPR measurement, as shown at block 610. At block 612, an average of the first CPR measurement and the pseudo second CPR measurement is calculated, and a second correction constant is determined for each grid location based on the average, as shown at block 614.

As shown at block 616, determining the first correction constant (block 604) comprises fitting the first CPR measurement to a two-dimensional polynomial of the form:

$$\text{misregistration} = \sum_{i=0, j=0}^{i+j=2} C_{ij} \cdot X^i \cdot Y^j$$

where X and Y comprise a coordinate location on the media page, and C comprises a correction constant associated with the coordinate location.

As shown at block 618, determining a second correction constant (block 614) comprises fitting the average of the first CPR measurement and the uncorrected second CPR measurement to a two-dimensional polynomial. As shown at block 620, in some examples, fitting the average to a two-dimensional polynomial comprises fitting the average to the two-dimensional polynomial comprising the form:

$$p_n = \text{fit}\left(\frac{\sum_{i=1}^{n} m_i - p_{i-1}}{n}\right)$$

where p comprises a polynomial corresponding with measurement m.

What is claimed is:

1. A method of iterative calibration comprising:
   in a first iteration, measuring first values of a calibration parameter;
   determining first corrections for the measured first values;
   in a next iteration, measuring next values of the calibration parameter that incorporate the first corrections;
   omitting the first corrections from the next iteration measurements to provide pseudo iteration measurements; and averaging the first iteration measurements with the pseudo iteration measurements; and determining second corrections based on the averaging.

2. A method as in claim 1, further comprising applying the second corrections to a subsequent iteration.

3. A method as in claim 1, wherein the calibration parameter comprises a printing press misregistration parameter and each first value comprises a misregistration at a particular (x,y) location on a sheet of print media.

4. A method as in claim 3, wherein determining first corrections for the measured first values comprises fitting the first values to a two-dimensional polynomial.

5. A method as in claim 4, wherein the two-dimensional polynomial comprises the form:

$$\text{misregistration} = \sum_{i=0, j=0}^{i+j=2} C_{ij} \cdot X^i \cdot Y^j$$

wherein X and Y comprise a coordinate location on the sheet of print media, and C comprises a correction constant associated with the coordinate location.

6. A method as in claim 1, wherein the averaging further comprises averaging data from all previous iterations prior to determining subsequent corrections for a subsequent iteration.

7. A method as in claim 1, further comprising performing a number of subsequent iterations after said next iteration, each subsequent iteration comprising omitting corrections from an immediately previous iteration to obtain measurements for a current iteration and averaging measurements from previous iterations with the measurement for the current iteration before determining a set of new corrections for the next subsequent iteration.

8. A method as in claim 1, wherein the first and next values being measured are registration values to calibrate registration of a plane printed by a printing press.

9. A printing device comprising:
a print engine to iteratively print a pattern on a sheet in a color plane;
a measurement module to determine a misregistration of the color plane;
an iterative calibration module to determine a first correction based on misregistration from a first iteration, apply the first correction to the print engine for a second iteration, remove the first correction from a result of the second iteration, average the first and second iterations to determine a second correction, and apply the second correction to the print engine for a third iteration.

10. A printing device as in claim 9, further comprising a measuring device to measure the misregistration.

11. A printing device as in claim 10, wherein the measuring device comprises an in line scanner to capture an image of the pattern for each iteration.

12. A printing device as in claim 9, wherein the pattern comprises printed points, each printed point having an (x,y) coordinate location on the sheet.

13. A printing device as in claim 12, wherein the misregistration comprises an offset between an expected location of each printed point and a measured location of each printed point.

14. A printing device as in claim 9, further comprising the iterative calibration module to average data from all previous iterations prior to determining subsequent corrections for a subsequent iteration.

15. A printing device as in claim 9, further comprising the iterative calibration module to perform a number of subsequent iterations after said third iteration, each subsequent iteration comprising omitting corrections from an immediately previous iteration to obtain measurements for a current iteration and averaging measurements from previous iterations with the measurement for the current iteration before determining a set of new corrections for the next subsequent iteration.

16. A non-transitory machine-readable storage medium storing instructions that when executed by a processor of a printing device, cause the printing device to:
take a first color plane registration (CPR) measurement at a plurality of grid locations on a media page;
determine a first correction constant for each grid location;
adjust the printing device based on the first correction constants;
take a second CPR measurement at the plurality of grid locations;
remove the first correction constants from the second CPR measurement to determine a pseudo second CPR measurement;
calculate an average of the first CPR measurement and the pseudo second CPR measurement; and
determine a second correction constant for each grid location based on the average.

17. A medium as in claim 16, wherein determining a first correction constant comprises fitting the first CPR measurement to a two-dimensional polynomial.

18. A medium as in claim 17, wherein the two-dimensional polynomial comprises the form:

$$\text{misregistration} = \sum_{i=0, j=0}^{i+j=2} C_{ij} \cdot X^i \cdot Y^j$$

and wherein X and Y comprise a coordinate location on the media page, and C comprises a correction constant associated with the coordinate location.

19. A medium as in claim 16, wherein determining a second correction constant comprises fitting the average of the first CPR measurement and the uncorrected second CPR measurement to a two-dimensional polynomial.

20. A medium as in claim 19, wherein fitting the average to a two-dimensional polynomial comprises fitting the average to the two-dimensional polynomial comprising the form:

$$p_n = \text{fit}\left(\frac{\sum_{i=1}^{n} m_i - p_{i-1}}{n}\right)$$

wherein p comprises a polynomial corresponding with measurement m.

* * * * *